United States Patent
Waszkiewicz et al.

(10) Patent No.: US 6,360,541 B2
(45) Date of Patent: Mar. 26, 2002

(54) INTELLIGENT ELECTRIC ACTUATOR FOR CONTROL OF A TURBOCHARGER WITH AN INTEGRATED EXHAUST GAS RECIRCULATION VALVE

(75) Inventors: Wayne Waszkiewicz; Christopher C. Greentree, both of Redondo Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/791,140

(22) Filed: Feb. 22, 2001

Related U.S. Application Data

(60) Provisional application No. 60/186,648, filed on Mar. 3, 2000.

(51) Int. Cl.[7] .............................................. F02B 33/44
(52) U.S. Cl. ..................... 60/605.2; 60/602; 123/568.12
(58) Field of Search ................................ 60/605.2, 602; 123/564, 568.12

(56) References Cited

U.S. PATENT DOCUMENTS

| | | | | |
|---|---|---|---|---|
| 5,791,146 A | * | 8/1998 | Dungner | 60/605.2 |
| 5,794,445 A | * | 8/1998 | Dungner | 60/605.2 |
| 6,035,639 A | * | 3/2000 | Kolmanovsky et al. | 60/605.2 |
| 6,035,640 A | * | 3/2000 | Kolmanovsky et al. | 60/605.2 |
| 6,055,810 A | * | 5/2000 | Borland et al. | 60/605.2 |
| 6,067,800 A | * | 5/2000 | Kolmanovsky et al. | 60/602 |
| 6,076,353 A | * | 6/2000 | Freudenberg et al. | 60/605.2 |
| 6,128,902 A | * | 10/2000 | Kolmanovsky et al. | 60/605.2 |
| 6,202,414 B1 | * | 3/2001 | Schmidt et al. | 60/605.2 |
| 6,311,494 B2 | * | 11/2001 | McKinley et al. | 60/605.2 |
| 2001/0029935 A1 | * | 10/2001 | Cook | 60/605.2 |

* cited by examiner

Primary Examiner—Thomas Denion
Assistant Examiner—Thai-Ba Trieu
(74) Attorney, Agent, or Firm—Flex L. Fischer

(57) ABSTRACT

An exhaust gas recirculation (EGR) system for an engine with a variable geometry turbocharger (18) incorporates a master rotary electric actuator (REA) (50) with a microprocessor controller (53) receiving condition signals (46, 48a–e) from sensors (48) associated with the turbocharger and the engine control unit (ECU) (54) and positioning the turbine inlet nozzle (44) geometry of the turbocharger in response to a predetermined matrix of the condition signals. A slave REA (52) is connected through an internal processing unit (58) to the controller to position an EGR valve (34). The processing unit provides an actual position signal to the controller which responds with a desired position signal based on the predetermined condition signal matrix. The processing unit engages the slave REA to position the EGR valve.

5 Claims, 3 Drawing Sheets

INTELLIGENT ELECTRIC ACTUATOR FOR CONTROL OF A TURBOCHARGER WITH AN INTEGRATED EXHAUST GAS RECIRCULATION VALVE

CROSS REFERENCE TO RELATED APPLICATIONS

This application claims the priority of application Ser. No. 60/186,648 filed on Mar. 3, 2000 having the same title as the present application.

BACKGROUND OF THE INVENTION

1. Field of the Invention

The present invention relates generally to control of turbochargers used in engines with Exhaust Gas Recirculation (EGR) systems, and more particularly, to an intelligent electric actuator with diagnostics and memory capabilities using turbocharger rotational speed, air and EGR gas temperatures, and air and EGR gas pressures, for control of a variable geometry turbocharger with integrated EGR valve.

2. Description of the Prior Art

Commercial diesel vehicles typically employ turbochargers for increased efficiency of the engine. Further, the regulatory requirements for decreases in federal NOx emissions levels for year 2002, and beyond, diesel engines have made engine air systems control a more complex and important part of overall engine performance. Control of the turbocharger and EGR systems of the engine comprise the primary means for such air systems management.

A turbocharger's useful life is, among other things, largely a function of the speed/duty cycle to which it is subjected, specifically with respect to the fatigue life of the turbine wheel and compressor wheel (or perhaps an internal component of the turbocharger). It is very difficult to know exactly what particular speed/duty cycle the turbocharger is subjected to for any given application. This therefore makes it very difficult to predict what the useful life of the turbocharger will be with respect to fatigue related failures. Therefore, fatigue failures of turbocharger wheels can and do occur without notice. Proactively replacing the turbocharger at a "safe" accumulated time is not cost effective and results in excessive downtime of the engine.

SUMMARY OF THE INVENTION

The present invention is applicable to a controlled turbocharger such as, but not limited to, a wastegated turbocharger or a variable geometry inlet nozzle turbocharger (VGT) with an actuator to operate the wastegate or VGT vane set. By inputting the turbocharger's shaft speed, air gas temperatures, air gas pressures, EGR gas temperatures, and EGR gas pressures into the intelligent electric actuator, this data can then be used as to better control the actuation of the wastegate or VNT nozzle set.

The software employed by the controller is designed such that various min/max speeds, temperature and pressure thresholds are pre-set with the subsequent excursions of speed, temperature and pressure recorded as these thresholds are achieved and/or exceeded.

An array of thresholds is pre-determined for the particular application. This data is stored in the actuator's memory for future use. By defining the fatigue life of the compressor wheel or turbine wheel for a given wheel design, size, material, etc., and having the specific fatigue life information programmed into the REA, several advantages exist.

From the inputs of speed, temperature and pressure, the electric actuator is better used to more precisely control the turbocharger's wastegate or VGT nozzle set. This information is also used to control EGR percentage directly and therefore control engine out emission level more precisely.

Once a predetermined number of speed, temperature and/or pressure thresholds have been achieved, the electric actuator can, in various embodiments, control (reduce) the speed of the turbocharger by predicting when a wheel fatigue failure is imminent.

Once a predetermined number of speed, temperature and/or pressure thresholds have been achieved, the electric actuator can, in various embodiments, trip a switch to notify the operator to "replace the turbocharger" by predicting that a fatigue failure is imminent.

The electric actuator can store into memory operational field data for future use in maintenance profiling of specific turbocharger operating conditions of various applications (on-highway truck, inner-city truck, pleasure craft, tug boat, front-end loader, bulldozer, mine truck, excavator, gen-set, etc.).

The speed/duty cycle data stored in the electric actuator can be down loaded and used in the warranty adjudication process or as a diagnostic tool for failure evaluation.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION OF THE INVENTION

Figure 1:
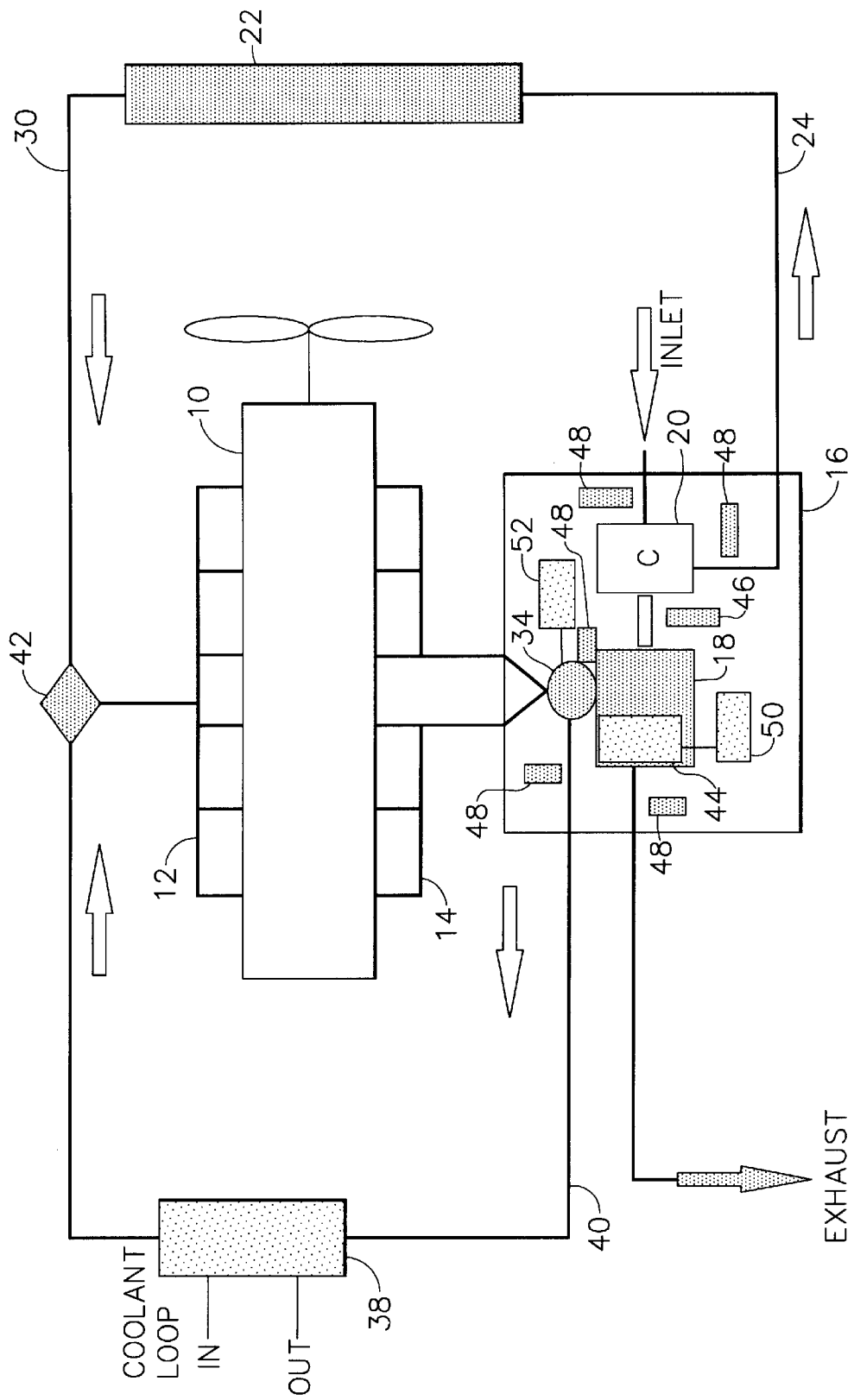
FIG. 1 is a schematic illustration of an internal combustion engine having a variable geometry turbocharger with an integrated EGR valve actuated according to the present invention.

Referring now to FIG. 1, an internal combustion engine having a turbocharger and an EGR system is schematically illustrated. Engine 10 includes an intake manifold 12 and an exhaust manifold 14. In the illustrated embodiment, the engine includes a turbocharger 16, generally comprising a turbine contained in a housing 18 and a compressor contained in a housing 20, for compressing the intake air of engine 10. The intake air is heated during the turbocharger compression process and must be cooled to satisfy engine durability and performance requirements. That cooling is accomplished by routing the air discharged from the turbocharger 16 to a charger air cooler (CAC) 22 via conventional conduits or ducting 24. The intake air is then routed from the CAC to the intake manifold of the engine via conventional conduits or ducting 30.

Engine 10 also includes an EGR system. The EGR system includes a control valve 34, integrated into the turbocharger in accordance with the present invention, that regulates the proportion of exhaust gas that is taken from the exhaust manifold and either returned to the engine induction system for mixing with the intake air that has passed through the CAC, or directed to the turbine of the turbocharger. The control valve 34 routes a portion of the exhaust gas received into the turbine housing from the exhaust manifold through the EGR system.

The EGR system also includes an engine mounted EGR cooler 38 or heat exchanger for cooling the exhaust gas passing through the system. By providing a heat exchanger in the EGR conduit or ducting 40, the efficiency of engine 10 is improved. Other advantages, such as a reduction in NOx and PM emissions and in fuel consumption also result from the presence of the heat exchanger 38. The exhaust gas passing through the heat exchanger 38 is then combined with the intake air that has passed through the CAC in an EGR mixer 42. The mixture of the intake air and exhaust gas leaves the mixer 42 and enters the intake manifold of the engine.

A variable geometry nozzle 44 in the turbocharger is utilized for back pressure in the turbine housing inlet and exhaust manifold. A speed sensor 46 determines the rotational speed of the turbocharger shaft and pressure/temperature sensors, generally designated 48 provide temperature and pressure at the inlet and outlet of the compressor, the inlet and outlet of the turbine and at the outlet of the EGR flow control valve for EGR differential pressure determination. A first rotary electric actuator (REA) 50 controls the nozzle vanes of the variable geometry inlet nozzle to the turbine. A second REA 52 controls the EGR valve which may be of comparable structure to that defined in the copending patent application Ser. No. 09/782,810 and entitled TURBOCHARGER WITH INTEGRATED EXHAUST GAS RECIRCULATION VALVE having a common assignee with the present application, the disclosure of which is incorporated herein by reference.

Figure 2:
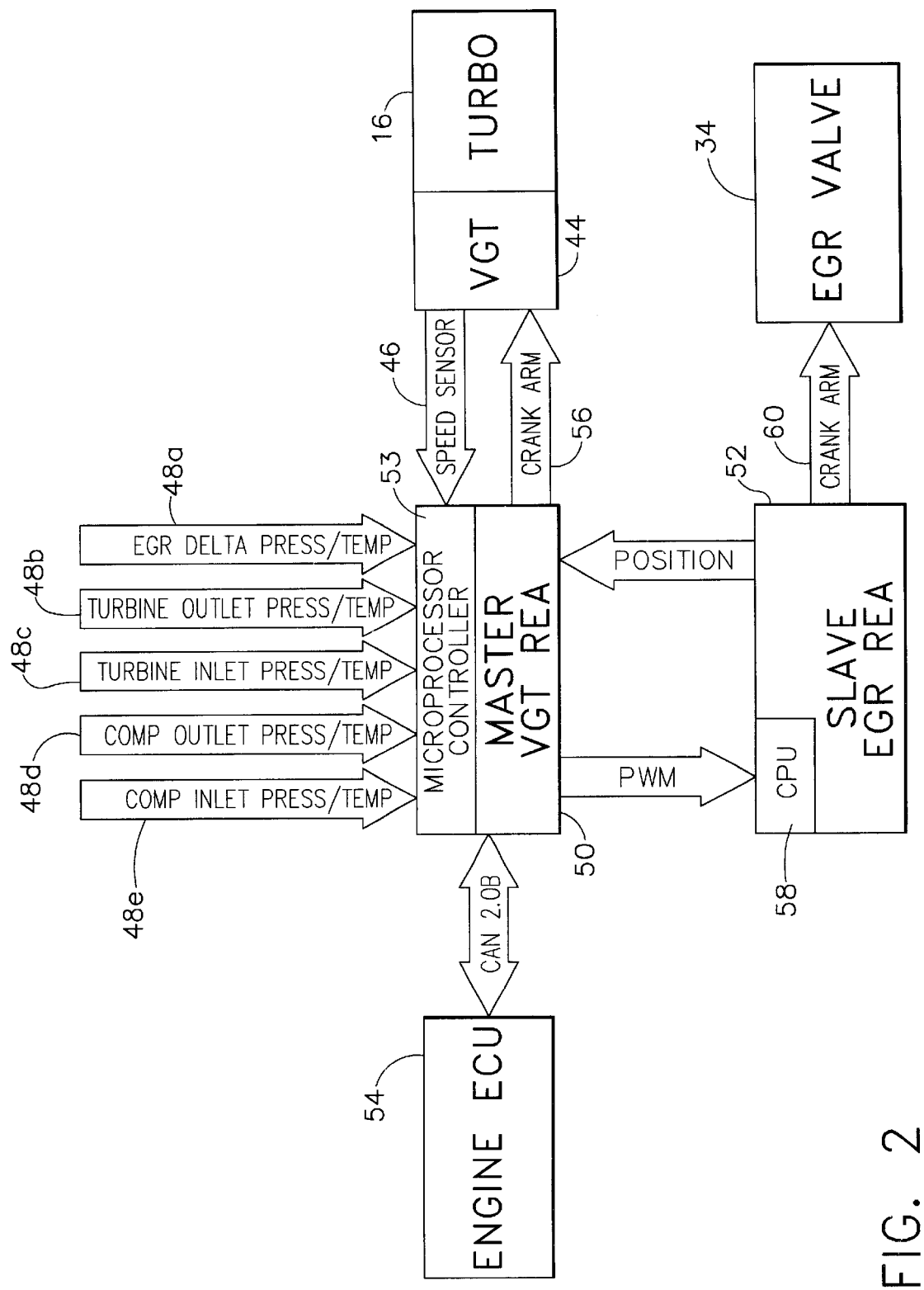
FIG. 2 is a block diagram of the control structure for the turbocharger and actuators incorporating the present invention.

As shown in FIG. 2, the REAs are interconnected in a master/slave arrangement. The first REA for controlling the VGT vane position incorporates a microprocessor controller 53 which receives inputs from the EGR pressure and temperature sensor 48a, the turbine outlet pressure and temperature sensor 48b, the turbine inlet pressure and temperature sensor 48c, the compressor outlet pressure and temperature sensor 48d and the compressor inlet pressure and temperature sensor 48e. The engine operating condition is provided from the engine control unit (ECU) 54 through a CAN 2.0B interface to the microprocessor and an input from the speed sensor is provided from the turbocharger. Based on a predetermined matrix of sensor input conditions mapped to engine operating requirements, the microprocessor controller actuates the master REA to position the crank arm 56 to adjust the vanes of the VGT to optimize turbocharger performance.

Additionally, the microprocessor controller receives a position signal from the second or slave REA and provides a signal to a central processing unit (CPU) 58 in the second REA, based on the predetermined mapping matrix. A pulse width modulated (PWM) signal is employed in the embodiment shown. The CPU actuates the REA to position its crank arm 60 to actuate the EGR valve 34 to control EGR flow to the engine. The master/slave arrangement provides simultaneous interactive control of the VGT for exhaust back pressure to control the EGR flow rate.

The microprocessor controller additionally selectively records data from the speed sensor and temperature pressure sensors and calculates cycle information. The microprocessor controller compares the calculated cycle data with predetermined cycle information in the mapping matrix for predicted fatigue life of the turbocharger components and, upon reaching predetermined limits actuates the first REA for a "limp home" mode or other speed limitation to preclude failure and in alternative embodiments provides an output signal for operator notification through the CAN interface.

Figure 3:
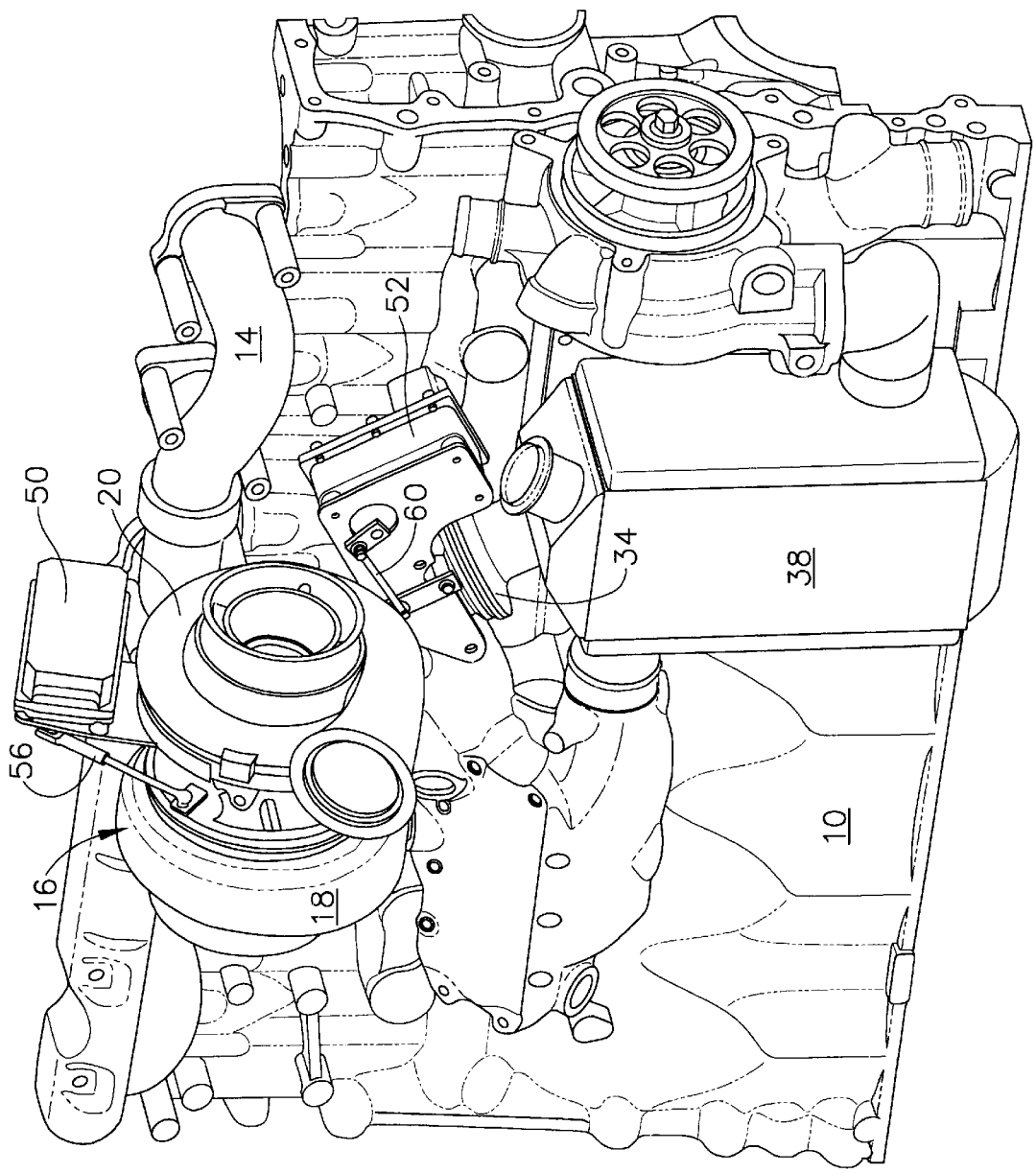
FIG. 3 is an exemplary pictorial view of an engine with a turbocharger employing actuators incorporating the present invention in conjunction with an EGR system.

FIG. 3 shows a diesel engine arrangement with a turbocharger incorporating the present invention, with an alternative embodiment from that previously described, using a segregated EGR valve mounted adjacent the EGR cooler.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An Exhaust Gas Recirculation (EGR) system for an internal combustion engine comprising:
   a turbocharger (16) having a variable geometry turbine inlet nozzle (44) receiving exhaust gas from an exhaust manifold (14);
   an adjustable EGR valve (34) having an inlet connected to receive exhaust gas from the exhaust manifold;
   a master actuator (50) with first adjusting means connecting to the variable geometry turbine inlet nozzle for adjustment thereof through a range of positions, said master actuator further having a controller (53) receiving a first plurality of turbocharger condition signals (46, 48a–e) and a second plurality of engine condition signals, the controller positioning the first adjusting means responsive to the first and second plurality of signals; and
   a slave actuator (52) with second adjusting means connecting to the EGR valve for adjustment thereof to at least an open position and a closed position, said slave actuator having a processing means (58) providing a current position signal to the controller of the master actuator and receiving from the controller a desired position signal responsive to the actual position signal and the first and second plurality of signals, the processing means positioning the second adjusting means responsive to the desired position signal.

2. An EGR system as defined in claim 1 wherein the first adjusting means comprises a rotary electric actuator connected through a crank arm (56) to the variable geometry inlet nozzle (44).

3. An EGR system as defined in claim 2 wherein the second adjusting means comprises a rotary electric actuator connected through a crank arm (60) to the EGR valve (34).

4. An EGR system as defined in claim 1 wherein the turbocharger condition signals are selected from the group of compressor inlet pressure, compressor inlet temperature, compressor outlet pressure, compressor outlet temperature, turbine inlet temperature, turbine inlet pressure, turbine outlet temperature, turbine outlet pressure, EGR pressure, EGR temperature and turbocharger shaft speed.

5. A method for controlling Exhaust Gas Recirculation (EGR) in an internal combustion engine having a variable geometry turbocharger, the method comprising the steps of:
   receiving a plurality of turbocharger condition signals through a controller of a master actuator;
   receiving a plurality of engine condition signals through the controller;
   determining a desired setting for the variable geometry of the turbocharger based on a predetermined matrix of the turbocharger and engine condition signals;
   controlling the geometry of the turbocharger to the desired setting with the master actuator;

providing an actual position signal of a slave actuator connected to an adjustable EGR valve through a processor to the controller;

determining a desired position of the EGR valve based on the predetermined matrix of turbocharger and engine conditions signals;

providing a desired position signal from the controller to the processor; and controlling the position of the EGR valve by the slave actuator through the processor.

* * * * *